(12) United States Patent
Cirne et al.

(10) Patent No.: US 9,935,812 B1
(45) Date of Patent: Apr. 3, 2018

(54) PERFORMANCE EVALUATION OF APPLICATIONS THAT ACCESS EXTERNAL RESOURCES

(75) Inventors: Lewis Karl Cirne, Palo Alto, CA (US); James Robert Gochee, Portland, OR (US); Saxon Michael D'Aubin, Portland, OR (US)

(73) Assignee: New Relic, Inc., San Francisco, CA (US)

( * ) Notice: Subject to any disclaimer, the term of this patent is extended or adjusted under 35 U.S.C. 154(b) by 1335 days.

(21) Appl. No.: 12/584,833

(22) Filed: Sep. 10, 2009

(51) Int. Cl.
*G06F 15/173* (2006.01)
*H04L 29/08* (2006.01)
*H04L 12/26* (2006.01)
*H04L 29/06* (2006.01)

(52) U.S. Cl.
CPC ........ *H04L 29/08072* (2013.01); *H04L 29/06* (2013.01); *H04L 43/00* (2013.01)

(58) Field of Classification Search
USPC ...... 709/224; 707/1, 999.001, 713, 716, 718
See application file for complete search history.

(56) References Cited

U.S. PATENT DOCUMENTS

| | | | |
|---|---|---|---|
| 6,249,783 B1 * | 6/2001 | Crone et al. | |
| 6,513,154 B1 * | 1/2003 | Porterfield | 717/101 |
| 6,816,874 B1 * | 11/2004 | Cotner et al. | 707/769 |
| 7,702,642 B1 * | 4/2010 | Wolfman et al. | 707/999.101 |
| 2003/0066053 A1 * | 4/2003 | Al-Azzawe | 717/127 |
| 2003/0182276 A1 * | 9/2003 | Bossman et al. | 707/3 |
| 2004/0143795 A1 * | 7/2004 | Matsuishi | 715/530 |
| 2005/0138111 A1 * | 6/2005 | Aton et al. | 709/201 |
| 2005/0283457 A1 * | 12/2005 | Sonkin et al. | 707/1 |
| 2006/0085375 A1 * | 4/2006 | Egan et al. | 707/1 |
| 2006/0212417 A1 * | 9/2006 | Barsness et al. | 707/1 |
| 2007/0174335 A1 * | 7/2007 | Konig et al. | 707/104.1 |
| 2007/0266045 A1 * | 11/2007 | Bansal et al. | 707/104.1 |
| 2008/0215536 A1 * | 9/2008 | Day et al. | 707/2 |

* cited by examiner

*Primary Examiner* — Vivek Srivastava
*Assistant Examiner* — Hien Doan
(74) *Attorney, Agent, or Firm* — Van Pelt, Yi & James LLP

(57) ABSTRACT

Evaluating application performance includes: obtaining a request, processing the request, including invoking a function that accesses an external resource, determining whether a response time associated with invoking the function exceeds a threshold, and in the event that the response time exceeds the threshold, capturing a runtime attribute associated with the function.

17 Claims, 6 Drawing Sheets

| Metric | Timestamp seconds | Duration ms | Exclusive ms |
|---|---|---|---|
| ApdexController#index ? | 0.000 | 277,539 | 112 |
| SQL - SELECT ? | 0.004 | 0 | 0 |
| ▷ User#find_by_sql ? | 0.004 | 0 | 0 |
| ▷ Account#find_by_sql ? | 0.004 | 4 | 0 |
| ▷ Account#find_by_sql ? | 0.008 | 0 | 0 |
| ▷ AccountView#find_by_sql ? | 0.008 | 0 | 0 |
| ▷ ShardSpecification#find_by_sql ? | 0.008 | 4 | 0 |
| ▷ Subscription#find_by_sql ? | 0.012 | 0 | 0 |
| ▷ Product#find_by_sql ? | 0.016 | 0 | 0 |
| ▽ Agent#find_by_sql ? | 0.016 | 16 | 0 |
| Agent#find ? | 0.016 | 16 | 16 |
| Account#find_by_sql ? | 0.032 | 0 | 0 |
| ▽ RealAgent#find_by_sql ? | 0.036 | 648 | 640 |
| RealAgent#find ? | 0.036 | 8 | 8 |
| ▷ AgentRun#find_by_sql ? | 0.704 | 756 | 0 |
| MemCache read ? | 1.460 | 0 | 0 |
| ▷ AgentRun#find_by_sql ? | 1.500 | 0 | 0 |
| ▷ find_and_aggregate ? | 1.520 | 275,071 | 436 |
| ▷ apdex/index.rhtml Template ? | 276.607 | 36 | 32 |
| ▷ layouts/application.rhtml Template ? | 276.643 | 892 | 160 |
| TrackedPageRequest#create ? | 277.539 | 0 | 0 |

FIG. 5

Timestamp   Duration    SQL
0.036       640ms       SELECT * FROM 'agent_runs' where
('agent_runs'.'real_agent_id' IN (16863, 16867, 16868,
..., ..., ...
) ORDER BY launch_time DESC LIMIT 1

Explain Plan:
    Duration: 756ms
    Select Type: SIMPLE
    Table: agent_runs
    Type: range
    Possible Keys: by_agent_and_time_window
    Key: by_agent_and_time_window
    Key Length: 5
    Reference: none
    Rows: 172753
    Extra: using where; using filesort

Application Stack Trace
Show Rails
/app/models/virtual_agent.rb: 122:in 'most_recent_run'
/app/models/agent_run.rb:244:in 'with_agents_scope'
/app/models/virtual_agent.rb: 23: in 'most_recent_run'
/config/initializers/memory_watcher.rb:29:in 'load_time_zone'

FIG. 6

PERFORMANCE EVALUATION OF APPLICATIONS THAT ACCESS EXTERNAL RESOURCES

BACKGROUND OF THE INVENTION

As computer software becomes more sophisticated, performance evaluation has also become a more complex task. In some client-server applications, for example, many different calls are made to the server application and it can be difficult and time-consuming to pinpoint performance bottlenecks. One technique often employed by software developers is to manually insert logging code to facilitate performance evaluation. The addition of logging code, however, can negatively impact the overall performance of the system and may only provide limited information on how the bottlenecks occurred.

BRIEF DESCRIPTION OF THE DRAWINGS

Various embodiments of the invention are disclosed in the following detailed description and the accompanying drawings.

FIG. 5 is a diagram illustrating an example user interface displaying performance monitoring results of an application.

FIG. 6 is a diagram illustrating an example user interface displaying the diagnostic information pertaining to a selected call.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
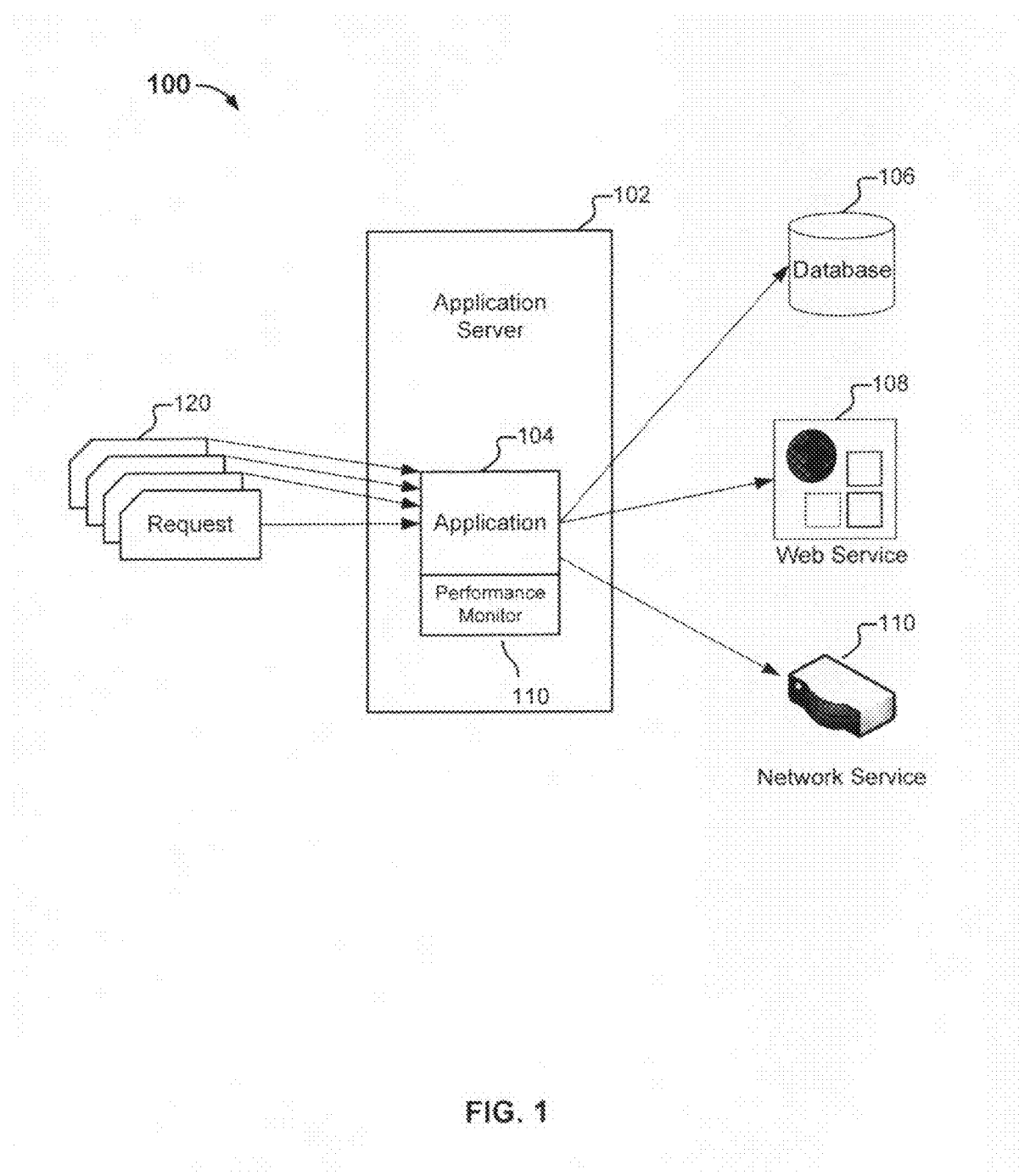
FIG. 1 is a block diagram illustrating an embodiment of a performance evaluation system.

FIG. 1 is a block diagram illustrating an embodiment of a performance evaluation system. System 100 includes an application server 102, on which one or more applications 104 are installed and executed. The application server receives requests such as 120. The requests may be sent by client devices, other applications (either on the same server or on a different server), function calls within application 104, or other appropriate request generating source. For example, in some embodiments, the application server is a web server, the application is a web application, and the request may be a Hypertext Transfer Protocol (HTTP) request.

To process a request, the application will access an external resource (i.e., a resource that is not an integral part of the application), such as database 106, web service 108, network service 110, or other appropriate resource. An external resource is typically installed and executed on a device other than the application server, but may sometimes be installed and executed on the same application server in a different process. The application is programmed to accesses the external resource using a suitable protocol. For example, to access a database such as ORACLE™ or Microsoft SQL SERVER™, Structured Query Language (SQL) calls are made; to access web services such as credit card processing service or message queuing service, HTTP calls are made; and to access network services such as socket services, networking calls such as open_socket are made. These external resource access calls sometimes cause performance bottlenecks, and can be specifically identified and diagnosed using techniques described below.

A performance monitor 110 is configured to monitor the performance of application 104. In some embodiments, the performance monitor is implemented as special instrumentation code (also referred to as probes) that cooperates with the application to detect any slowdown in the application's access to external resources. For example, in some embodiments where the application is implemented using RUBY ON RAILS™ (Rails), the source code of certain external resource access classes is replaced with performance monitoring code that carries out the same function and additionally performs monitoring functions. In a more specific example, SQL database access calls all flow through a class named ActiveRecord::Base, which is replaced with instrumented code that invokes the original code, and additionally collects performance information such as the amount of time spent on accessing the external resource (referred to as the response time) and other runtime attributes. In some embodiments where the application is implemented using JAVA™, the byte code of certain external resource access functions and libraries is replaced with byte code with additional monitoring functions. Other implementations such as binary code replacement may be used as appropriate.

Figure 2:
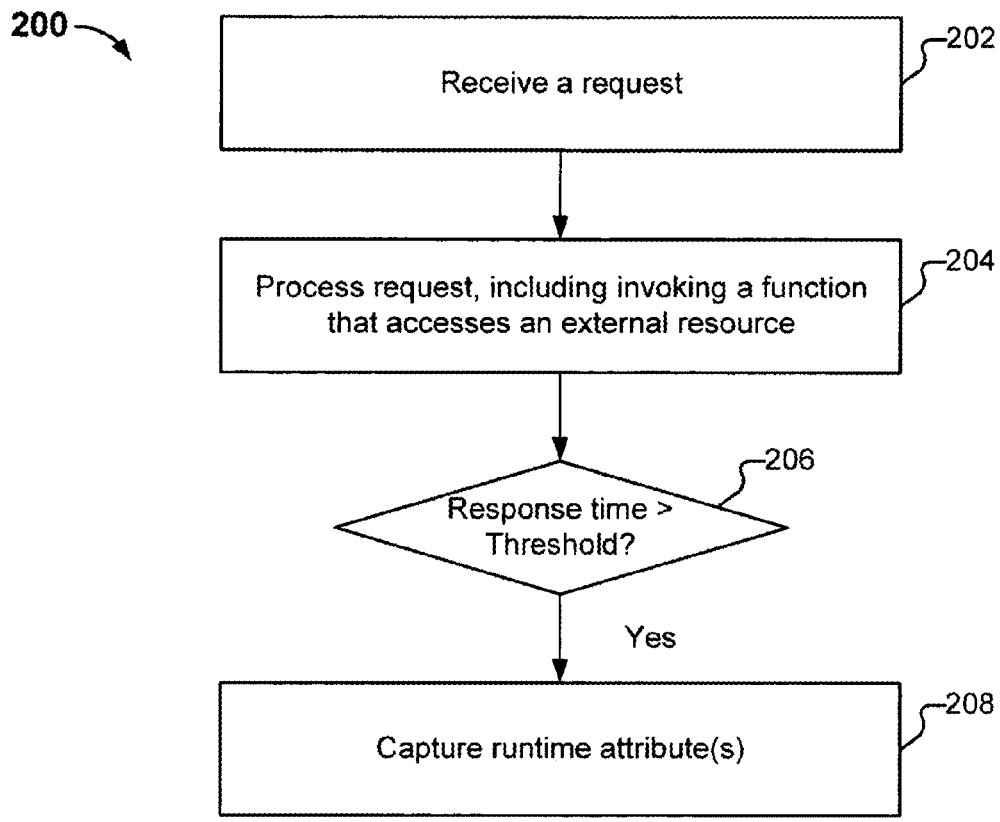
FIG. 2 is a flowchart illustrating an embodiment of an application monitoring process.

FIG. 2 is a flowchart illustrating an embodiment of an application monitoring process. Process 200 maybe performed by application servers such as 102. At 202, a request is received. The request may be received from a client, another server, a different application running on the same server, or a function call in the same application. At 204, the request is processed. A response, if required, is generated and provided to the requester based on results of the invocation. In some embodiments, the processing includes invoking a function that accesses an external resource such as a database, a web service, a network connection, etc. The function has been previously instrumented to include monitoring code to determine the function's response time. In some embodiments, the total response time, i.e., the total amount of time spent processing the request (e,g., a Process_HTTP_Request function) is determined. In some embodiments, the remote function call response time, i.e., the amount of time required to execute a remote function call to the external resource (e.g., a SQL_Select call that is invoked by the Process_HTTP_Request function) is determined. In some embodiments, both types of response time are recorded.

At 206, it is determined whether the response time exceeds a predefined threshold. Depending on whether the response time is a total response time or a remote function call response time, different thresholds may be set. In some embodiments, both types of response time are compared with their respective thresholds. If the response time does not exceed the threshold, the performance of the function's invocation is considered normal and no further process is required. If, however, the response time exceeds the threshold, at 208, further investigation is needed and one or more runtime attributes associated with the invocation of the function are captured. By examining these runtime attributes, the software developer can identify certain causes for the slowdown. For example, in some embodiments, the runtime attributes include a stack trace of the function's stack frame(s), which can be used to pinpoint certain code that invokes the external resource access and causes the slowdown. In some embodiments, the runtime attributes include parameter(s) associated with the invocation of the function. For example, an incorrect parameter can slow down the function call. In some embodiments, the runtime attributes include the return value/payload information of the function, which may indicate that too much data is being passed and therefore slowing down the access. In some embodiments, the runtime attributes include performance statistics, which may indicate that resource constraints or a heavy load on the external resource is causing the slowdown.

Figure 3:
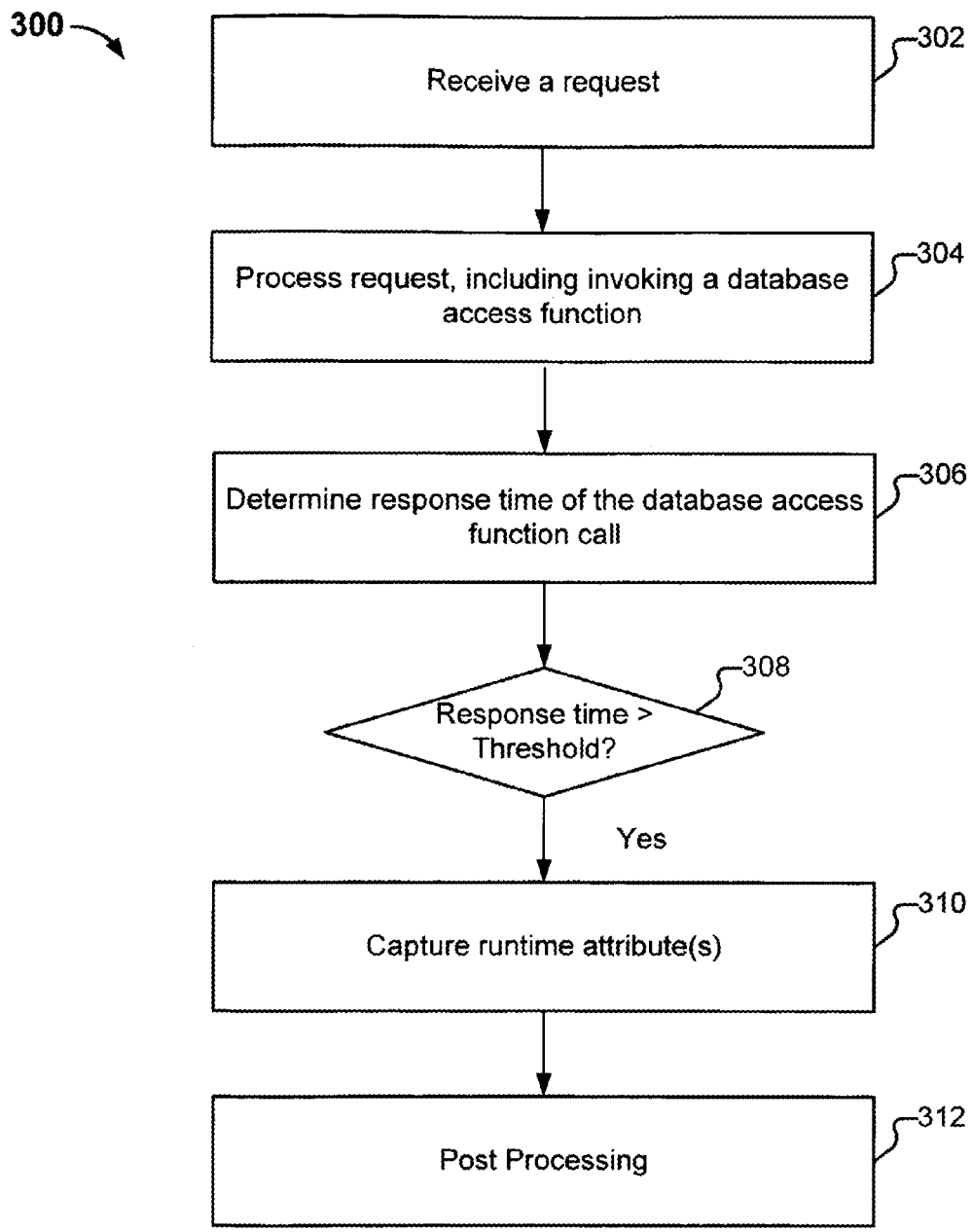
FIG. 3 is a flowchart illustrating another embodiment of another application monitoring process.

FIG. 3 is a flowchart illustrating another embodiment of another application monitoring process. In this example, at 302, a request is received at the application server. At 304, the request is processed, and a database access function is invoked in response to the request. For example, the request may ask for account information of a user. To generate the response, the application performs a database access function to get the account information from a user database. At 306, the start and finish times of the database access function are measured based on previously inserted instrumentation code in the database access function. Thus, the response time of the database access function call is determined based on the measured start time and finish time. At 308, it is determined whether the response time that is measured exceeds a predefined threshold. No further action is required if the response time does not exceed the predefined threshold. If, however, the threshold is exceeded, at 310, one or more runtime attributes are captured. In addition to the runtime attributes described above in connection with process 200, in some embodiments additional runtime attributes are saved for post processing. For example, database connection information of the database access call, which includes information pertaining to user credential, database host, port, and/or any other appropriate information required for making the database connection, is saved in data structures or other memory that is accessible by the post processing code. The function is marked for post processing.

At 312, post processing is performed to get more in-depth diagnostic information. Since post processing operations can be expensive to perform, they are sometimes performed asynchronously, in a thread or a process that is separate from the function invocation to more efficiently batch process multiple calls and reduce performance impact on the main application.

The following is a pseudocode example of an instrumented database access function:
Function Instrumented_SQLCall
    record start time
    execute Original_SQLCall
    record finish time
    if (finish time−start time)>threshold
    save configuration
    get runtime attributes such as stack trace, etc.

Figure 4:
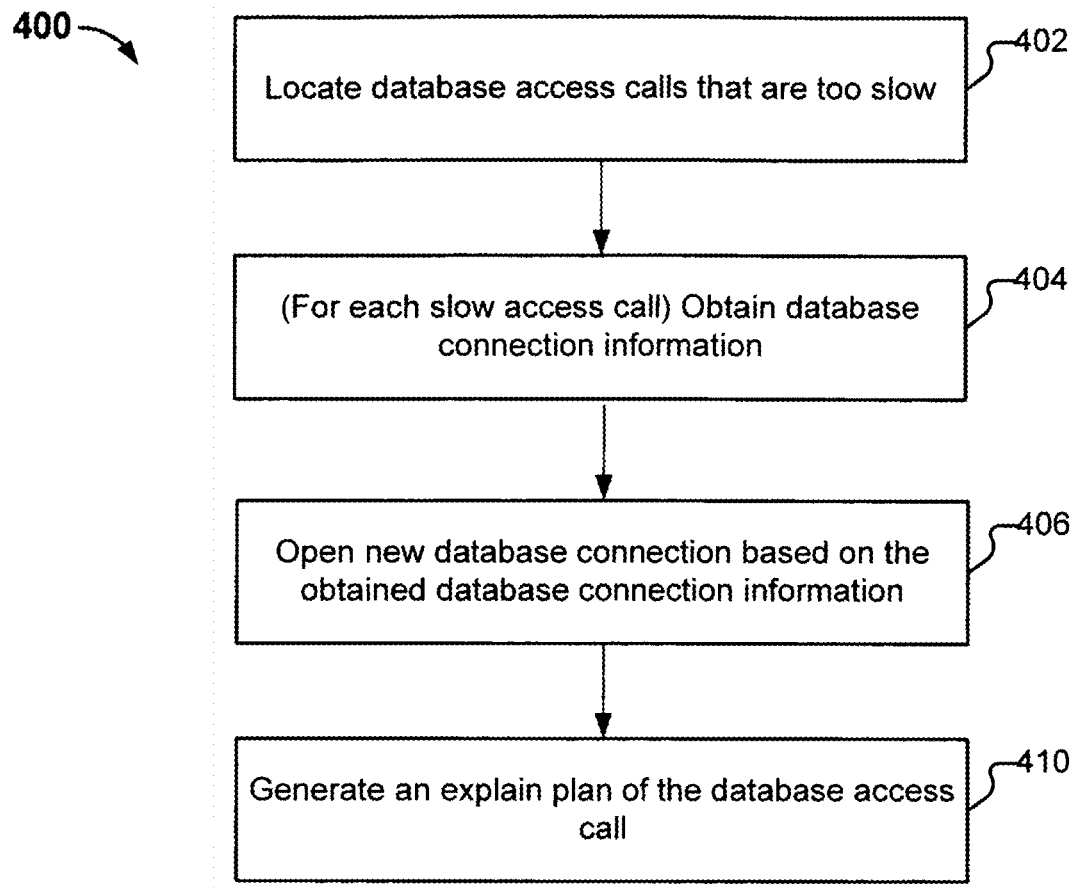
FIG. 4 is a flowchart illustrating an embodiment of a process configured to perform post processing.

FIG. 4 is a flowchart illustrating an embodiment of a process configured to perform post processing. In this example, process 400 starts by locating database access calls that are deemed to be too slow (i.e., execution duration exceeding threshold), at 402. In some embodiments, such function calls are marked and/or stored in memory so that they can be located by the post processing steps. In this example, for each slow function call, at 404, database connection information is obtained from the server application. In some embodiments, the connection information is included in a configuration file of the application or statically encoded in the application. In some embodiments, the connection information is stored in memory location(s) and/or data structure(s) accessible by the post processing steps. The database connection information includes the user credential, database host, port, etc. associated with the original database access call.

At 406, a new database connection is opened using the same database connection information as the original call. At 408, an explain plan is generated for the original database call, over the new database connection. The explain plan is a database feature that describes how the database would execute the database access function. For example, whether indexes are used, which indexes are used, what type of database operation is performed, if temporary tables are used, and how many rows would be accessed. Analysis of the explain plan can be helpful for determining the cause for the slowdown. For example, queries on tables that don't use an index run quickly when the number of rows is small but progressively get slower as the number of rows grows. Knowing that a query is slow, looking at an explain plan and seeing that a large number of rows is accessed and that an index is not being used is enough information for a software developer to quickly see that adding an index will speed up queries.

In some embodiments, post processing further includes invoking a debug version of the function. The debug function is invoked under substantially the same condition, using the same parameters as the invocation of the original function. The debug version of the function will provide extra diagnostic information such as log information, break points, or any other appropriate debugging facilities.

The following is a pseudo code example for a post processing function that operates in a separate thread and diagnoses slow SQL calls:
Function Post_Process_SQL
    for each slow SQLCall
    get database connection information
    open new database connection generate explain plan (SQLCall(new database connection))

FIG. 5 is a diagram illustrating an example user interface displaying performance monitoring results for a service call to an application. The access duration of calls to external resources, including various SQL calls and memory cache (MemCache) access calls, are measured. In this example, call times in the "Exclusive" column correspond to call durations minus any nested calls to child functions, which more accurately represent how long the calls take than the times recorded in the "Duration" column, which includes time spent on nested calls. A threshold of 100 ms is used in this example. Calls that took longer than 100 ms to complete, such as the RealAgent#find_by_sql call that occurred at time 0.036, find_and_aggregate call that occurred at 1.520, and layouts/application.rhtml Template call at 276.643 are highlighted, indicating that these calls warrant special attention since their execution time exceeded the threshold.

The software developer can select a call from the table to view further performance monitoring details. FIG. 6 is a diagram illustrating an example user interface displaying the diagnostic information pertaining to a selected call. In this example, performance information of a SQL call that is made at time 0.036 and lasted for 640 ms is displayed (note that entries in the SQL select statement are largely omitted for purposes of simplicity). The explain plan for the SQL call indicates that a large number of rows (172,753) are returned, and a filesort operation (invoked by the "Order By" operation of the SQL call) is performed. These factors contribute to the slow execution of the call. Additionally, the stack trace shows the functions and line numbers of the chain of calls that lead to this SQL call, starting at "load_time_zone" of the "memory_watcher" file and ending at the "most_recent_run" of the "virtual_agent" file. Knowing the causes and locations of the slowdown can help the software developer make decisions about modifying the database access call to reduce the amount of access time.

Performance evaluation of applications that invoke function calls that access external resource has been described. Although database access and using explain plan to identify bottlenecks in the access calls have been discussed extensively for purposes of example, the technique can also be used to diagnose slowdowns in other types of external resource access.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for evaluating application performance, comprising: a processor configured to:
 receive a plurality of external resource access calls that access a plurality of external resources, the plurality of external resources comprising at least a database resource and a web service resource;
 process the plurality of external resource access calls, including for each external resource access call:
  invoking an instrumented function that includes an original function that accesses an external resource and monitoring code to monitor the performance of invoking the original function;
  determine a response time associated with said each external resource access call;
  determine whether the response time associated with said each external resource access call exceeds a response time threshold;
  use a result of the determination as a basis for whether to further process the external resource access call, including:
   in the event that the response time exceeds the response time threshold:
    capture a runtime attribute associated with the external resource access call that exceeds the response time threshold; and
    mark the external resource access call that exceeds the response time threshold for post processing to obtain diagnostic information;
   in the event that the response time does not exceed the response time threshold:
    omit capturing the runtime attribute and omit marking with respect to the external resource access call that does not exceed the response time threshold; and
 perform post processing on the each marked external resource access call exceeding the response time threshold using at least in part the captured runtime attribute to obtain additional performance information, wherein performing post processing includes invoking a post processing function corresponding to the marked external resource access call using the corresponding captured runtime attribute, wherein the post processing function includes additional diagnostic code used to analyze the original function that accesses an external resource, and wherein the post processing function is different from the instrumented function; and
 a memory coupled to the processor, configured to provide the processor with instructions.

2. The system of claim 1, wherein the post processing is performed asynchronously.

3. The system of claim 1, wherein the original function is a database access function.

4. The system of claim 3, and the post processing comprises generating an explain plan of the database access function.

5. The system of claim 4, wherein the runtime attribute includes database connection information associated with the invocation of the database access function, and generating the explain plan includes opening another database connection using the database connection information.

6. The system of claim 5, wherein the database connection information includes user credential information, database host information and port information.

7. The system of claim 1, wherein the runtime attribute includes a stack trace associated with the external resource access call that exceeds the response time threshold.

8. The system of claim 1, wherein the runtime attribute includes a parameter that is used to invoke the external resource access call that exceeds the response time threshold.

9. The system of claim 1, wherein the runtime attribute includes a return value of the external resource access call that exceeds the response time threshold.

10. The system of claim 1, wherein the runtime attribute includes performance statistics.

11. The system of claim 1, wherein the external resource includes a networking resource.

12. A method for evaluating application performance, comprising:
 receiving a plurality of external resource access calls that access a plurality of external resources, the plurality of external resources comprising at least a database resource and a web service resource;

processing the plurality of external resource access calls, including for each external resource access call:
- invoking an instrumented function, that includes an original function that accesses an external resource and monitoring code to monitor the performance of invoking the original function;
- determine a response time associated with said each external resource access call;
- determining whether the response time associated with said each external resource access call exceeds a response time threshold;
- using a result of the determination as a basis for whether to further process the external resource access call, including:
  - in the event that the response time exceeds the response time threshold, further comprising:
    - capturing a runtime attribute associated with the external resource access call that exceeds the response time threshold; and
    - marking the external resource access call that exceeds the response time threshold for post processing to obtain diagnostic information; and
  - in the event that the response time does not exceed the response time threshold:
    - omitting capturing the runtime attribute and omitting marking with respect to the external resource access call that does not exceed the response time threshold; and performing post processing on the each marked external resource access call exceeding the response time threshold using at least in part the captured runtime attribute to obtain additional performance information, wherein performing post processing includes invoking a post processing function corresponding to the marked external resource access call using the corresponding captured runtime attribute, wherein the post processing function includes additional diagnostic code used to analyze the original function that accesses an external resource, and wherein the post processing function is different from the instrumented function.

13. The method of claim 12, wherein the original function is a database access function.

14. A computer program product for evaluating application performance, the computer program product being embodied in a non-transitory computer readable storage medium and comprising computer instructions for:
- receiving a plurality of external resource access calls that access a plurality of external resources, the plurality of external resource types comprising at least a database resource and a web service resource;
- processing plurality of external resource access calls, including for each external resource access call:
  - invoking an instrumented function that includes an original function that accesses an external resource and monitoring code to monitor the performance of invoking the original function;
  - determine a response time associated with said each external resource access call;
  - determining whether the response time associated with said each external resource access call exceeds a response time threshold;
  - using a result of the determination as a basis for whether to further process the external resource access call, including:
    - in the event that the response time exceeds the response time threshold, further comprising:
      - capturing a runtime attribute associated with the external resource access call that exceeds the response time threshold; and
      - marking the external resource access call that exceeds the response time threshold for post processing to obtain diagnostic information; and
    - in the event that the response time does not exceed the response time threshold:
      - omitting capturing the runtime attribute and omitting marking with respect to the external resource access call that does not exceed the response time threshold; and performing post processing on the each marked external resource access call exceeding the response time threshold using at least in part the captured runtime attribute to obtain additional performance information, wherein performing post processing includes invoking a post processing function corresponding to the marked external resource access call using the corresponding captured runtime attribute, wherein the post processing function includes additional diagnostic code used to analyze the original function that accesses an external resource, and wherein the post processing function is different from the instrumented function.

15. The computer program product of claim 14, wherein the original function is a database access function.

16. The system of claim 1, wherein different response time thresholds are set in response to the response time corresponding to the total amount of time spent processing the external resource access call or the time for receiving the response to the external resource access call.

17. The system of claim 1, wherein in the event that the response time exceeds the response time threshold, connection information relating to the external resource access call is recorded, the connection information including a user credential associated with the external resource access call, a database host associated with the external resource access call, a port associated with the external resource access call, or any combination thereof.

* * * * *